Jan. 14, 1958     J. C. EHRLICH ET AL     2,819,739
APPARATUS FOR THE PROCESSING OF TISSUE MATERIAL
Filed March 28, 1955     3 Sheets-Sheet 1
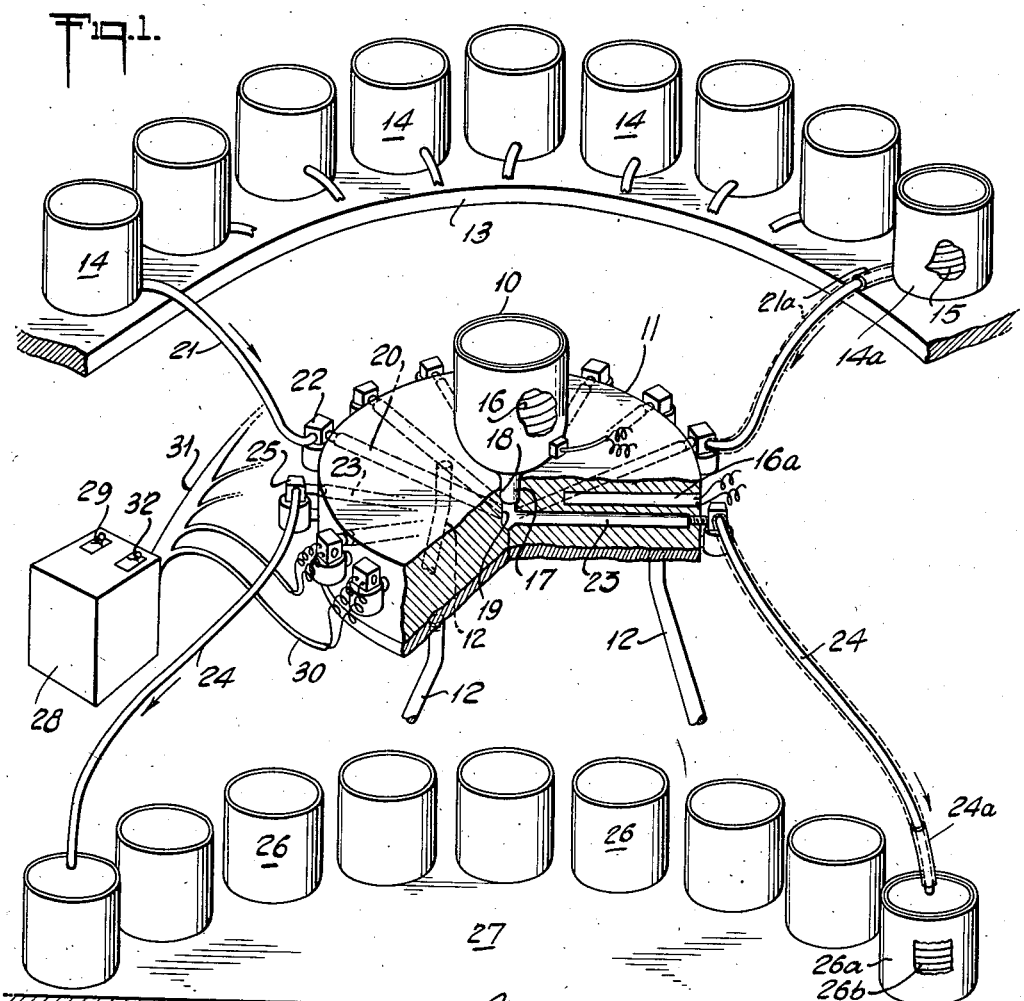
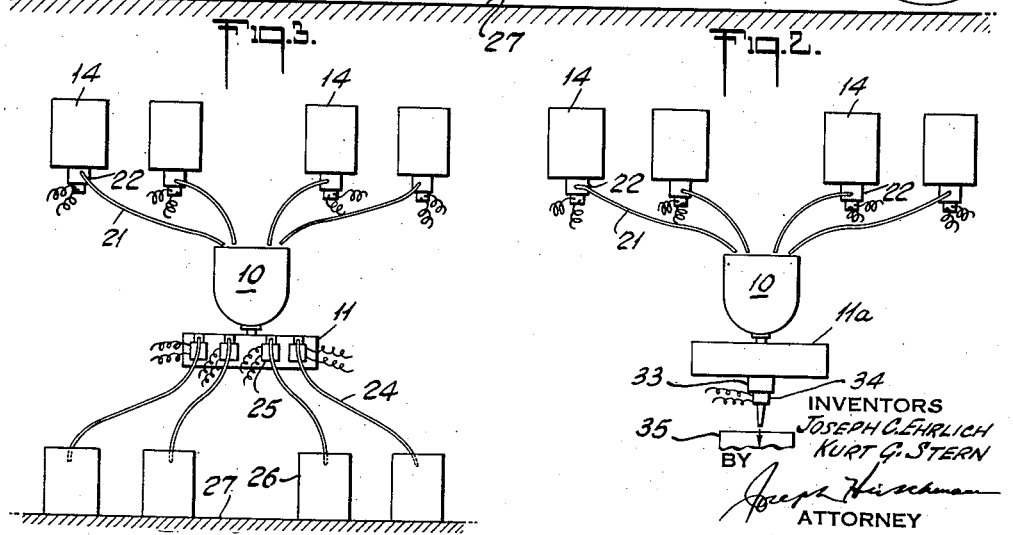
INVENTORS
JOSEPH C. EHRLICH
KURT G. STERN
BY
ATTORNEY

INVENTORS
JOSEPH C. EHRLICH
KURT G. STERN
BY
ATTORNEY

Jan. 14, 1958   J. C. EHRLICH ET AL   2,819,739
APPARATUS FOR THE PROCESSING OF TISSUE MATERIAL
Filed March 28, 1955   3 Sheets-Sheet 3
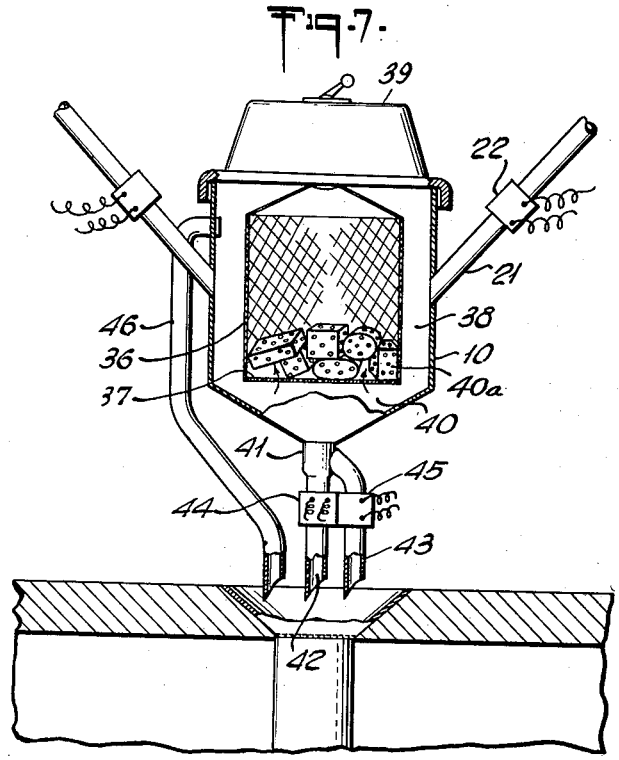
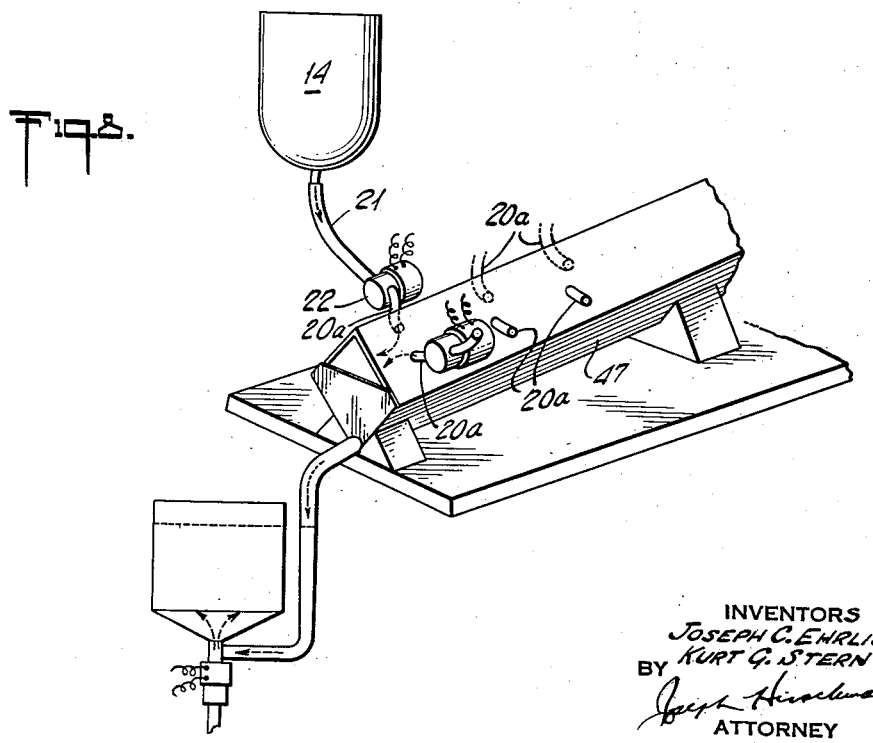
INVENTORS
JOSEPH C. EHRLICH
KURT G. STERN
BY
ATTORNEY

United States Patent Office 2,819,739
Patented Jan. 14, 1958

2,819,739

APPARATUS FOR THE PROCESSING OF TISSUE MATERIAL

Joseph C. Ehrlich and Kurt G. Stern, New York, N. Y.; Hans S. Grossmann, executor of the estate of said Stern, deceased, assignor to said Ehrlich Application March 28, 1955, Serial No. 497,102

17 Claims. (Cl. 141—82)

The present invention relates to apparatus for processing tissue material successively with a plurality of different liquids or with liquids having an active component of different concentrations, or with liquids composed of mixtures of solvents of varying proportions, for effecting extraction, staining, washing, dehydration, or other treatment.

The present invention is an improvement on the apparatus disclosed in the co-pending application of Joseph C. Ehrlich, Serial No. 421,943, filed April 8, 1954.

The invention is of particular utility for the preparation of human and animal tissue specimens for microscopic examination and will accordingly be further described, and by way of example, in connection with an apparatus for executing automatic or semi-automatic treatment of such specimens in the preparation of histological slides for microscopic study.

It is the general object of the invention to provide an apparatus for bringing a series of solutions of any desired or required number, and one after another, into contact with the specimens to be treated and then removing the solutions from the specimens after pre-determined intervals of treatment, said apparatus being characterized by a minimum of moving parts.

A further object of the invention is to provide an apparatus wherein the flow of the several liquids from a group of supply containers to the receptacle for the tissue specimens and, if desired, also the discharge of the liquids from such receptacle, are controlled electrically by means of solenoid-operated valves which are under the control of an adjustable timing mechanism.

It is a more specific object of the invention to provide an apparatus whereby a series of solutions operating in succession to dehydrate more or less completely one or more tissue specimens contained in a receptacle are charged in succession to the specimens by gravity, and after the specimens have been dehydrated, there is charged thereinto a quantity of a fusible substance which is solid at room temperatures, such as a wax or resin, in order to prepare the specimens for embedding, cutting and staining, preliminary to microscopic study of the treated specimens, all of such operations being accomplished automatically pursuant to a pre-determined cycle, the apparatus including automatically controlled means for heating the supply container for the fusible material and likewise the tissue receptacle and the container for the used material, in order to keep the fusible material in the fluid condition.

A further object of the invention is to provide an apparatus of the kind indicated which is simple and compact in construction, reliable in operation, and requires a minimum of attention once the processing cycle is started.

Other objects and advantages of the invention will be apparent from the following more detailed description thereof and the features of novelty will be defined in the appended claims.

The accompanying drawing shows by way of example several embodiments of the invention. In said drawing:

Fig. 1 is a diagrammatic view in perspective showing an apparatus constructed and operating in accordance with the principles of the present invention;

Fig. 2 is a diagrammatic view in elevation, showing a plurality of supply containers and the receptacle into which they discharge at the top of the latter, the apparatus having a common discharge into a drain, the valve mechanisms and their electromagnetic control devices being arranged at the bottom of the respective supply containers;

Fig. 3 is a view similar to Fig. 2, but showing an arrangement in which a discharge container is associated with each supply container, the bank of discharge containers being arranged below the level of the receptacle and being connected to the latter by conduits controlled by electromagnetically operated valves;

Figure 4:
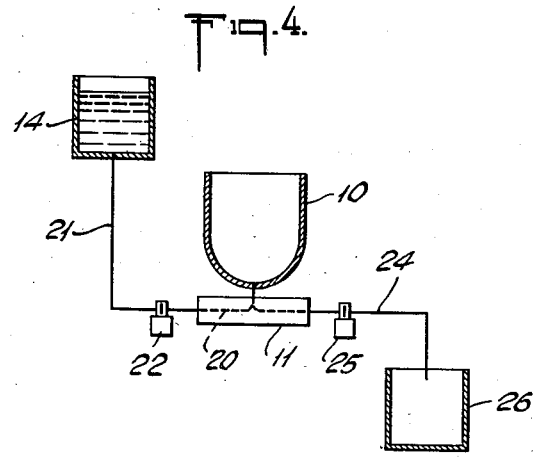
Figure 5:
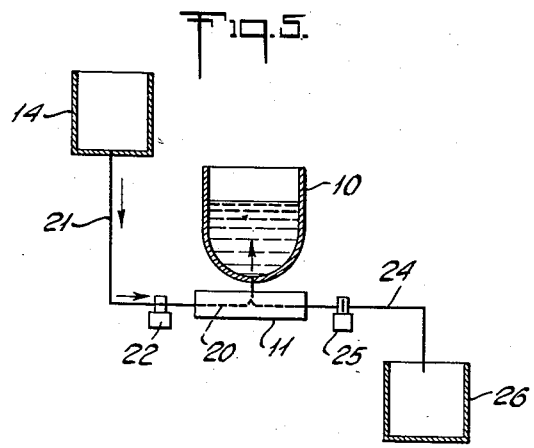
Figure 6:
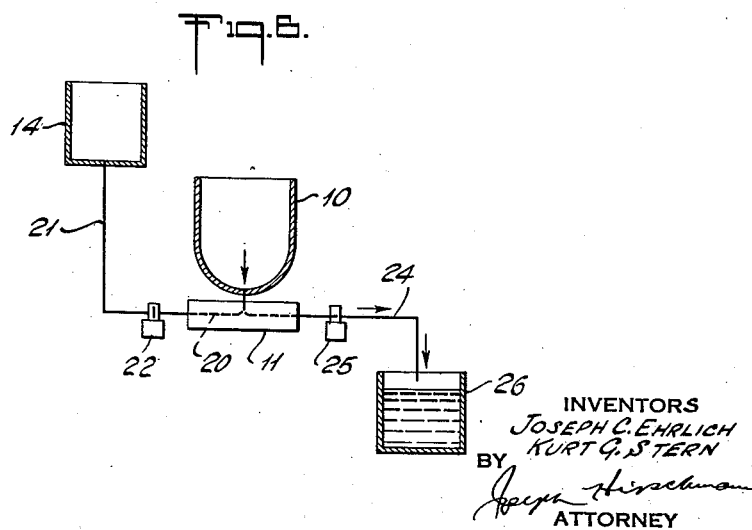

Figs. 4, 5 and 6 illustrate the operation of an arrangement according to Fig. 3, Fig. 4 showing a supply container and its associated receiving container, both connected by conduits to the tissue receiving receptacle, the valves controlling the supply and discharge conduits being both closed; while Fig. 5 shows the arrangement of Fig. 4, in which the supply valve is open, but the discharge valve closed, so that the receptacle becomes filled with the liquid from the supply container;

Fig. 6 shows the arrangement of the valves for discharging the receptacle; and

Figs. 7 and 8 illustrate further modifications.

Referring to the drawings, there is provided in the processing apparatus of the present invention a central receptacle 10 which is supported on a table 11 having legs 12. The receptacle 10 is disposed below the level of a shelf 13 which may extend completely around the receptacle or only along an arc. The shelf supports a plurality of supply containers 14 which are adapted to contain treating liquids of different kinds or of different concentrations which are to be charged in succession into receptacle 10, as will be explained more fully hereinafter.

The illustrated embodiment of the invention is intended to be employed for preparing human and animal tissue specimens for microscopic study by dehydrating the same and impregnating the specimens with a fusible wax or resin, paraffin being the material usually employed. Accordingly, the last of the containers 14, indicated at 14a, is charged with a quantity of liquid paraffin which is maintained in a fluid state by means of a heating coil 15. The receptacle 10 is similarly provided with a heating coil 16 to insure that the paraffin is maintained liquid during the predetermined interval of time it remains within the receptacle. The receptacle is preferably provided with a foraminated false bottom upon which the specimens rest. It will be understood that the receptacle is provided also with a suitable motor-driven stirring device of known construction to keep the liquids circulating about the specimens.

In the form of the invention illustrated in Fig. 1, the liquids are charged into receptacle 10 from the bottom and the latter is accordingly provided with a connection 17 which is supported within an opening 18 within the table 11, such opening leading into a co-axial chamber or bore 19 of somewhat smaller diameter and providing a shoulder on which the connection 17 can rest.

A plurality of radial supply passageways 20 within the body of the table are connected at their inner ends with the common chamber 19, and at their outer ends are connected with the supply conduits 21 by way of a valve device 22 which will be described hereinafter. The supply conduits lead from the bottom of the supply containers 14 and may be constituted of stainless steel or other materials resistant to the liquids charged into receptacle 10.

The chamber 19 communicates also with a plurality of discharge passageways 23, which may alternate with the passageways 20, and are connected to preferably stainless steel discharge conduits 24 by way of valve mechanisms 25. The discharge conduits 24 are connected with a series of discharge containers 26 located on a shelf or table 27 at a level below that of the receptacle 20. Preferably, a container 26 corresponds to each of the supply containers 24 and receives the fluid originally charged into the receptacle 10 by such supply container. The discharge container 26a corresponding to the supply container 14a is similarly provided with an electric heating coil to keep the paraffin or other fusible, normally solid impregnant sufficiently fluid for pouring.

The valve mechanisms 22 and 25 which control the communication between the receptacle 10 and the supply containers 14, on the one hand, and with the discharge containers 26 on the other, are electrically operated and may be in the form of solenoid valves of known construction. Upon energization of the circuit of the solenoid, the stem of the valve, which constitutes the armature or is connected to the armature of the solenoid, is lifted from its seat to enable the liquid to flow through the valve body. Upon de-energization of the circuit, the valve is returned to its seat by a spring. As the invention does not reside in the particular construction of the solenoid valve, its structure has not been shown in detail, it being understood that any suitable valve of this type, capable of periodic control, can be employed in our improved apparatus.

The valve mechanisms 22 and 25 are controlled in timed relation by a timing device 28 of any suitable construction. The timer 28 is preferably adjustable in character, so that the intervals between the opening of charging valve 22 and the opening of its corresponding discharge valve 25 may be varied. As many types of known timing devices can be employed in our apparatus and as the invention does not relate to the specific construction of such device, it has likewise not been shown in detail.

In the operation of the apparatus shown in Fig. 1, the containers 14 are filled with the proper quantity of liquids, while the container 14a is charged with a suitable quantity of paraffin, or the like. The tissue specimens are placed in the receptacle 10 and the switch 29 of the timing device is closed to start the cycle. This is accomplished by completing the electrical circuit of the solenoid of the charging valve 22 connected to the conduit 21 of the first container 14, this operation being controlled by the timing device 28 by way of conductors 30 which branch off from a common cable 31 leading from the timing device. The liquid from the first container 14 passes through the open valve 22 and by way of passageway 20 into the chamber 19 from which it rises through connection 17 to the space below the false bottom of the receptacle 10, the liquid rising in the receptacle until all of the speciments are immersed. The motor-driven stirrer is set into operation at any suitable moment. After a predetermined interval of time, the electrical circuit to the valve 22 is interrupted, the valve is returned to its seat by a spring or by gravity, and the associated discharge valve 25 is operated by its solenoid whose circuit is completed at the proper instant, whereupon the liquid drains from the receptacle 10 through conduit 23, valve 25, and conduit 24 into the corresponding discharge container 26. When the receptacle 10 has emptied, the discharge valve 25 is closed by the interruption of its solenoid circuit, and then the charging valve 22 of the next supply container 14 is opened by completion of its solenoid circuit. These operations are repeated for all of the containers 14.

At a suitable moment in the cycle, the circuits to the heating coils 15, 16, 16a and 26b are closed, so that when the valve 22 associated with the conduit of the supply container 14a is opened, liquid paraffin will flow into the receptacle 10. After the specimens have been impregnated with the liquid paraffin, the excess is discharged into the container 26a. The cycle being completed, an attendant returns the used liquid from the discharge containers 26 into the corresponding supply containers 14.

The solenoid valves employed may, if desired, be of the type which provides for manual opening and closing in addition to electrical operation, thus making it conveniently possible to move any group of fluids from the supply containers 14 through receptacle 10 to the receiving containers 26 for special purposes without the utilization or special adjustment of the automatic timing mechanism 28.

The heating coils 15, 16 and 26b, as well as the additional heating elements 16a, 21a and 24a, are preferably provided with pilot lights or other suitable indicators in order to alert the attendant to any possible failure of heating actions with consequent solidification of the wax or resin employed. The timing mechanism 28 is furthermore provided with conventional electrical circuits to turn on and/or off, as the case may be, the heating elements 15, 16, 26b, 16a, 21a, and 24a at appropriate moments in the cycle. Thus, at the start of operation of the apparatus, heating coil 15 of container 14a would be turned on to keep the paraffin container therein in fluid condition. When the moment arrives for the flow of paraffin from container 14a to the receptacle 10, the opening of the valve 22 connected with the conduit 21 leading from the heated paraffin supply container 14a would be accompanied by the simultaneous turning on of the heating elements 21a, 16a, and 16; simultaneously, also, the heating coil 15 of the paraffin supply container 14a would be turned off since its heat supply is no longer needed for the now empty container 14a. Similarly, when the moment arrives for the discharge of paraffin from the central receptacle 10 to the receiving container 26a, the heating elements 24a and 26b would be turned on and the heating elements 16, 16a and 21a, now no longer needed, would be turned off.

The operations above described are indicated diagrammatically in Figs. 4, 5, and 6. Fig. 4 shows the condition of the parts at the beginning of the cycle, in which the treating liquid is stored in the supply container 14. Upon opening of a valve 22, the liquid is charged by gravity into the receptacle 10, immediately following which the valve 22 is closed. After a predetermined interval of time, valve 25 is opened, the liquid then draining from receptacle 10 by gravity into the container 26, as indicated in Fig. 6.

As already indicated, the conduit leading from container 14a and also the conduit discharging into container 26a, as well as the solenoid valves 22 and 25 associated therewith are preferably also provided with heating means, for example, in the form of electrical heating tapes, indicated at 21a and 24a, which are at suitable times traversed by current to keep the paraffin in fluid condition.

The heating elements may be thermostatically controlled to insure that the paraffin is maintained in liquid condition while at the same time preventing over-heating thereof. As such thermostatic control devices for electric circuits are well known, they have not been illustrated in the drawing.

It will be understood that all of the parts of the apparatus which are contacted by the various liquids are resistant to any corrosive action of such liquids. A very satisfactory material is stainless steel, but various other metals like aluminum and various resistant alloys may also be used.

In the form of the invention illustrated in Fig. 2, the lower bank or tier of containers 26 and the associated discharge conduits 24 and discharge valves 25 are eliminated and there is provided a single drainage connection 33 having a solenoid-operated valve 34 therein and discharging into a waste receptacle 35 or into a drain pipe, so that all fluids discharged from the central receptacle 10 are instantly disposed of. As will be understood readily from Fig. 2, in the form of the invention therein disclosed, conduits 21 charge the respective liquids at the top of receptacle 10. It will be understood that the table 11a contains only a vertical passageway between the receptacle 10 and the connection 33, the passageways or ducts 20 and 23 of Fig. 1 being eliminated. But with this construction there is eliminated also the necessity for manually or mechanically transferring the liquids or the containers in the lower bank or tier to those in the upper bank. If desired, the valve 34 can be under the control of two solenoids to provide a margin of safety in the event that the first solenoid should fail to open, the second solenoid being automatically actuated after an interval of a few seconds and operating to open the valve, should it at such moment still be closed. In place of a single valve, operated by two solenoids, two separate solenoid-operated valves may be arranged in two branches of the drain connection, as shown in Fig. 7 described in detail hereinbelow.

Fig. 3 illustrates an arrangement wherein the conduits 21 leading from the supply containers 14 discharge into the receptacle 10 at the top thereof, as in Fig. 2, but the arrangement otherwise corresponds to that shown in Fig. 1.

Fig. 7 shows a central receptacle 10 adapted for use in an arrangement such as that shown in Fig. 2. The receptacle contains a removable basket 36 having perforate or imperforate sides and a foraminated bottom 37. The basket 36, which can be made of stainless steel wire mesh, is spaced from the wall of the receptacle to provide an annular space 38 into which the supply conduits 21 discharge upon opening of the associated electro-magnetically operated valves 22. The receptacle has a cover 39 in which may be mounted the motor-driven stirrer (not shown). The liquid entering the space 38 flows into the space 40 between the foraminated bottom 37 of the basket and the bottom of the receptacle, and then rises within the basket and surrounds and penetrates the tissue specimens contained therein and shown schematically at 40a.

The receptacle 10 is provided with a discharge tube 41 having two branches 42 and 43, each provided with a solenoid-operated valve 44 and 45 respectively. These valves are controlled from the timing mechanism and, as explained above, one is set to operate a few seconds after the other to insure discharge at the pre-determined moments in the cycle.

The receptacle 10 is provided also with an overflow 46 which discharges into the same waste container or drain pipe as the branches 42 and 43.

The construction shown in Fig. 7 prevents completely even the slight contamination of one liquid by the residual liquid of a preceding container 14 which occurs in the construction shown in Fig. 1. Also, the provision of the relatively narrow annular space 38 reduces splashing and foaming. The arrangement of Fig. 7 also makes it possible to remove the basket with the dehydrated specimens contained therein and to immerse the same in a paraffin bath outside receptacle 10. The removability of the basket 36 also facilitates the cleaning of receptacle 10.

It is, of course, not essential that the receptacle 10 in the arrangement of Fig. 1 be mounted on a table having ducts 20 and 23 therein; on the contrary, it may rest on any suitable support and be connected in various ways with the supply and discharge containers. Thus, in the form of the invention shown in Fig. 8, the tissue-receiving receptacle can be mounted on a table, shelf, or the like, at a level sufficiently below the containers 14 if the liquids are to flow by gravity, the receptacle receiving the liquid from the successive containers 14 by way of a tubular manifold 47 which may be circular or quadrangular or have any other suitable shape in cross-section. It will be evident that with this construction, each of the conduits 20a leading from the valves 22 will drain completely into the manifold and none of the fluid will be trapped in its own conduit or be able to enter any other than its own conduit, so that contamination will be minimized. The manifold 47 can lead to the top or bottom of the receptacle. The latter can be drained in the manner indicated in Fig. 2, or it may drain into a common discharge manifold from which separate conduits, under the control of timed solenoid valves, lead to the separate discharge containers.

It is not necessary that the receptacle 10 be arranged below the containers 14; if desired, it may be in the form of a sealed vessel on the same level as the containers 14, but provided with a connection to a suction device under the control of the timing mechanism whereby the liquids from the containers 14 may be sucked into the receptacle in series as the respective valves 22 are opened. The liquid in receptacle 10 may similarly be discharged into containers 26 located at the same level as the receptacle or returned to the original containers 14, appropriately applying the forces of suction and air pressure or gravity. In all cases, however, the arrangement will be such that receptacle 10, with the tissue specimens therein, is stationary, while the liquids are conveyed to and from the receptacle.

If desired, there may be employed in place of the relatively small containers 14, having a capacity approximately that of the receptacle 10, a series of rather large storage containers which discharge a measured amount of liquid into the receptacle under the control of a mechanical, electrical or other type of automatic switch, for example, a float-controlled switch, which closes the charging valve 22 as soon as the liquid in the receptacle has reached a pre-determined level. An arrangement of this type eliminates the necessity of transferring used liquid from the containers 26 to the containers 14, and it becomes necessary for the attendant to make sure only that the storage containers are periodically filled with fresh liquid at certain intervals, depending upon the size of the storage containers, the amounts used during each cycle, and the frequency of use of the apparatus. It may be of advantage also to construct the receptacle 10 of glass coated with an electrically conductive transparent film, such as Pyrex E–C glass made by Corning Glass Works, so that the level of the liquids in the receptacle can always readily be observed. Also, in place of the usual rotary stirrer, there may be employed a high frequency vibrating unit to insure penetration of the tissue specimens by the successive liquids.

We claim:

1. Apparatus for the processing of tissue material comprising, in combination, a bank of measuring supply containers of approximately equal volume and each adapted to receive a quantity of treating liquid, a stationary liquid holding receptacle adapted to be charged with tissue specimens and arranged to receive the liquid from each container in succession, conduits between the supply containers and the receptacle, valve mechanism for controlling said conduits, electromagnetic means for operating said valve mechanism, and a timing device for timing the operation of said electromagnetic means.

2. Apparatus according to claim 1, wherein the said bank of supply containers is disposed at a level higher than said receptacle, a second bank of containers arranged below the level of the receptacle, discharge conduits connecting the receptacle with the containers of said second bank, and valve mechanism controlling said discharge conduits.

3. Apparatus according to claim 2, including a separate solenoid-operated valve disposed in each of said supply and discharge conduits.

4. Apparatus according to claim 1, including a separate solenoid-operated valve disposed in each of said conduits.

5. Apparatus according to claim 1, including a single discharge conduit connected to said receptacle, and a solenoid-operated valve controlling said conduit.

6. Apparatus according to claim 1, including an overflow for said receptacle.

7. Apparatus according to claim 1, including a manifold between the supply containers and the receptacle externally of the receptacle and arranged to receive liquid from the supply containers in succession and charge the same into the receptacle, said conduits leading into said manifold.

8. Apparatus according to claim 7, wherein the receptacle is at a lower level than said supply containers, while said manifold is at a level intermediate those of the supply containers and receptacle, said conduits discharging into the upper portion of said manifold.

9. Apparatus for the processing of tissue material comprising, in combination, a bank of supply containers each adapted to receive a quantity of a treating liquid, a table, a stationary liquid holding receptacle for receiving tissue specimens supported on the table, a chamber within the table, a connection between the bottom of the receptacle and said chamber, a plurality of supply ducts in said table and leading to said chamber, a plurality of discharge ducts in said table and leading from said chamber, a bank of discharge containers for receiving the used liquids, conduits between the supply containers and the supply ducts, and between the discharge ducts and the discharge containers, electromagnetically operated valves controlling the flow through said conduits, and a timing device for controlling the opening and closing of said valves in pre-determined sequence.

10. Apparatus according to claim 9, wherein at least one of the supply containers is adapted to deliver a normally solid material in the liquid condition, and heating elements in said supply container, in the receptacle, and in the corresponding discharge container and controlled by said timing device.

11. Apparatus for the processing of tissue material comprising, in combination a bank of supply containers each adapted to receive a quantity of treating liquid, a stationary liquid holding receptacle adapted to be charged with tissue specimens and arranged to receive the liquid from each container in succession, conduits between the supply containers and the receptacle, valve mechanism for controlling said conduits, electromagnetic means for operating said valve mechanism, said bank of supply containers including a supply container for a fusible solid material, heating means arranged in said container, and means controlled by said timing mechanism for controlling the operation of said heating means.

12. Apparatus according to claim 11, including heating means associated with the receptacle for heating the contents thereof and controlled by said timing mechanism.

13. Apparatus for the processing of tissue material comprising, in combination, a bank of supply containers each adapted to receive a quantity of treating liquid, a stationary liquid holding receptacle adapted to be charged with tissue specimens and arranged to receive the liquid from each container in succession, conduits between the supply containers and the receptacle, valve mechanism for controlling said conduits, electromagnetic means for operating said valve mechanism, one of the supply containers being adapted to deliver a normally solid material in the liquid condition, and heating elements arranged to heat said container and receptacle to maintain said material in liquid condition and controlled by said timing device.

14. Apparatus as defined in claim 13, wherein the drain connection has two branches each provided with a solenoid-operated valve controlled by said timing device.

15. Apparatus for the processing of tissue material comprising, in combination, a bank of supply containers each adapted to receive a quantity of treating liquid, a stationary liquid holding receptacle adapted to be charged with tissue specimens and arranged to receive the liquid from each container in succession, conduits between the supply containers and the receptacle, valve mechanism for controlling said conduits, electromagnetic means for operating said valve mechanism, a basket having a foraminated bottom disposed within the receptacle, a drain connection leading from the bottom of the receptacle, valve mechanism controlling such drain connection, and two electromagnetically operated actuating mechanisms for said valve mechanism and each adapted to open said valve mechanism and controlled by said timing device.

16. Apparatus for processing of tissue material comprising, in combination, a bank of measuring supply containers each adapted to receive a quantity of treating liquid, a table, a receptacle supported on said table and having an opening in its bottom wall, a vertical duct in said table leading to the interior of said receptacle; a plurality of radiating passageways in said table leading from said duct, conduits connecting each of said supply containers with a passageway, there being as many passageways as there are supply containers, discharge means leading from said duct, solenoid-operated valves controlling said conduits and discharge means, and a timing device for timing the operation of said valves.

17. Apparatus according to claim 16, in which said discharge means comprises discharge passageways in said table radiating from said duct, a second bank of containers arranged below the level of the table, conduits connecting the discharge passageways with said last mentioned containers, and a solenoid-operated valve in each of said discharge conduits and controlled by said timing device.

References Cited in the file of this patent

UNITED STATES PATENTS

| | | |
|---|---|---|
| 2,561,631 | Negri | July 24, 1951 |
| 2,582,601 | Palik | Jan. 15, 1952 |
| 2,597,063 | Catanzano | May 20, 1952 |
| 2,704,082 | Jackson | Mar. 15, 1955 |
| 2,732,502 | Darney | Jan. 24, 1956 |